Aug. 14, 1928.   R. E. WATTS   1,681,072
MULTICYLINDER RECIPROCATING ENGINE, PUMP, AND COMPRESSOR
Filed Feb. 1, 1924   2 Sheets-Sheet 2
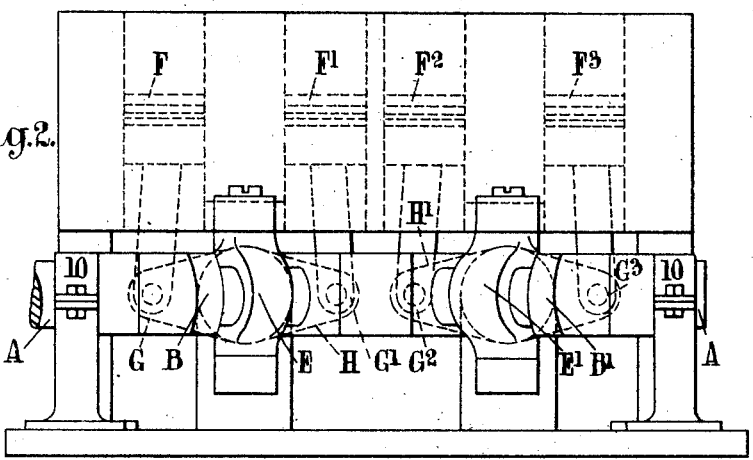
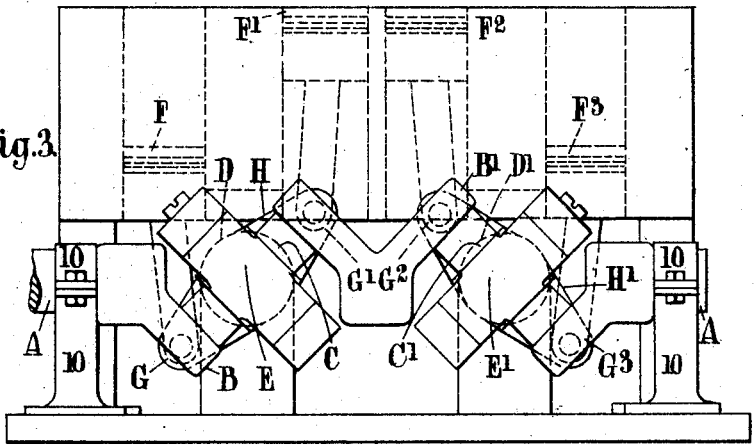
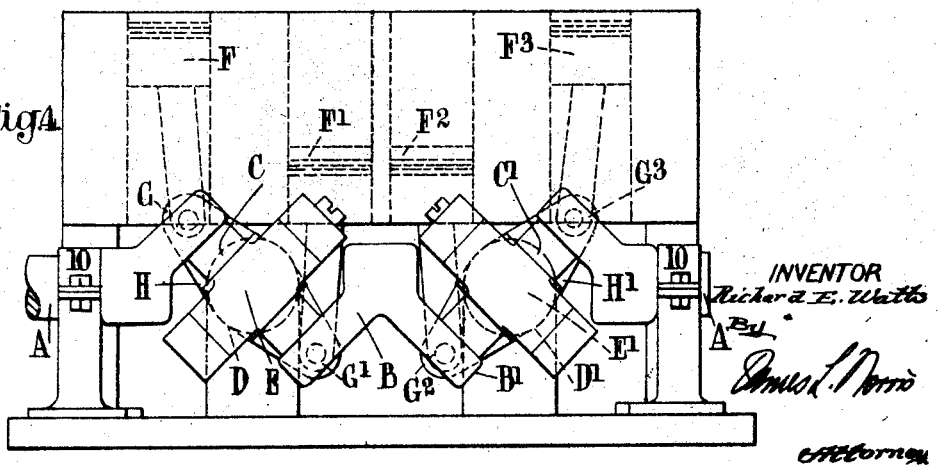

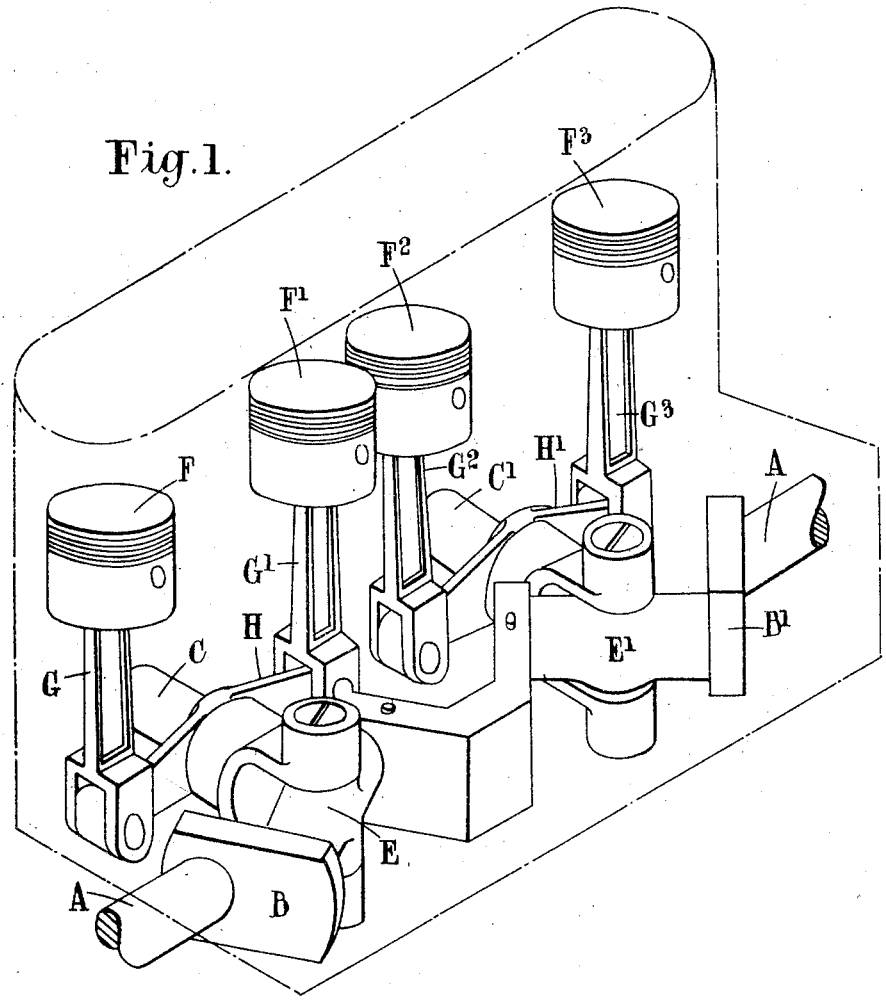

Patented Aug. 14, 1928.

1,681,072

UNITED STATES PATENT OFFICE.

RICHARD EDWARD WATTS, OF STAMFORD, ENGLAND.

MULTICYLINDER RECIPROCATING ENGINE, PUMP, AND COMPRESSOR.

Application filed February 1, 1924, Serial No. 690,006, and in Great Britain July 17, 1923.

This invention relates to multi-cylinder reciprocating engines, pumps and compressors, hereinafter comprehensively referred to as engines, and has for its object a novel construction whereby a substantially perfect balance of the moving parts is ensured and the height of the engine considerably reduced by making possible the use of very short connecting rods.

According to my invention the crank shaft is displaced laterally with respect to the axes of the cylinders, and the driving connection between the connecting rods and the crank shaft (which is constructed with Z-cranks) is made by oscillating shafts or members arranged at right angles to the crank shaft, and to the axes of the cylinders. These oscillating shafts or members have fixed on them arms or beams of which the opposite ends are coupled to the big ends of the connecting rods. The pistons with their connecting rods are arranged in pairs, each pair being connected to one oscillating shaft; but in large engines, two or more pairs of pistons may be connected to one ascillating shaft. The connection between the oscillating shafts and the crank shafts is made by universal joints.

An indefinite number of pairs of cylinders may be used to construct a powerful engine and in all cases the engine is much smaller for the power developed or utilized than other reciprocating engines known to me.

A convenient and advantageous construction is to arrange the cylinders in groups of four. The axes of the four cylinders may be in the same plane, or one pair may be in one plane, and the other pair in another plane, but in any case it is preferable that the centre of a line at right angles to the axes and joining the axes of the two inner cylinders and representing the centre of gravity of the two pistons and rods should coincide with the centre of a line at right angles to the axes and joining the axes of the two outer cylinders. The Z-cranks of each pair of cylinders are inclined at opposite angles, so that the pistons of the two outer cylinders are up when the pistons of the two inner cylinders are down and vice versa.

My improved construction of engine ensures that the connecting rods have a comparatively small angular movement so that inequality of movement of the pistons that are traveling in opposite directions is substantially eliminated. The connecting rods are preferably so arranged that they swing through an equal arc on each side of the centre line.

In the accompanying drawings, Figure 1 shows in isometric projection so much of a four-cylinder engine as is necessary to illustrate my invention.

Figures 2, 3 and 4 are diagrammatic illustrations showing the crank shaft in three different positions at intervals of 90 degrees.

The crank shaft A carried by bearings 10, 10 is constructed with two Z-cranks B, B' inclined in opposite directions and lying in the same plane. C, C' are oscillating members arranged at right angles to the crank shaft. They are supported in bearings D, D' and are coupled to the Z-cranks B, B' by swivel joints E, E'. The pistons F, F', $F^2$, $F^3$ are arranged with their axes in a common plane which is perpendicular to the plane containing the axes of the oscillating members, and the axis of the crank shaft. The crank shaft is parallel to the plane containing the axes of the pistons, and is displaced laterally with respect to said plane. The big ends of the piston rods G, G' are coupled to the opposite ends of a cross arm or beam H fixed on the oscillating member C, and the connecting rods $G^2$, $G^3$ are similarly coupled to a cross arm or beam H' fixed on the oscillating member C'. The lengths of the cross beams H, H' are such that the connecting rods will swing an equal distance on each side of the centre line. In an engine comprising eight cylinders arranged in two groups of four cylinders the crank pins of one group of four cylinders are advantageously arranged at right angles to the crank pins of the other group of four cylinders, so that, whilst the motion of the pistons in one group is being accelerated the motion of the pistons in the other group is being retarded; moreover, in the case of explosion engines of the four-stroke cycle type, four equally spaced explosions are obtained at each revolution of the crank shaft.

I claim:—

1. A multi-cylinder reciprocating engine comprising a crank shaft, crank pins comprised in the shaft and arranged with their axes intersecting the axis of the crank shaft obliquely, oscillatory members at right angles to the crank shaft and communicating rotary motion to the said crank shaft, beams on the oscillatory members, pistons respectively connected to opposite ends of the said beams, and cylinders in which the said pistons work arranged with their axes at right angles to the oscillatory members and to the crank shaft and so that the centre of gravity of two pistons respectively connected to different beams, and which move in the same direction at the same time, moves in the same line as the centre of gravity of the other two pistons respectively connected to the opposite ends of the same beams.

2. A multi-cylinder reciprocatory engine comprising a crank shaft, crank pins comprised in the shaft extending equally on either side thereof and arranged with their axes obliquely intersecting the axis of the said shaft, oscillatory members at right angles to the crank shaft and communicating rotary motion to the said crank shaft, beams on the oscillatory members, pistons respectively connected to opposite ends of the said beams, and cylinders in which the said pistons work arranged with their axes at right angles to the oscillatory members and to the crank shaft and so that the center of gravity of the pistons respectively connected to different beams, and which move in the same direction simultaneously, moves in a line coincident with the center of gravity of the other two pistons respectively connected to the opposite ends of the same beams.

3. A multi-cylinder engine comprising in combination a crank shaft having two crank pins respectively inclined in opposite directions with their axes intersecting the axis of the shaft, two oscillatory members set at right angles to the crank shaft and coupled respectively to the two crank pins by universal couplings having oscillatory mountings in the oscillatory members about axes passing through the intersections of the crank pins and shafts, four cylinders having their axes perpendicular to the plane containing the axes of the oscillatory members and the axis of the crank shaft, the axes of two of the cylinders lying on opposite sides of one oscillatory member, and those of the other cylinders lying on opposite sides of the other oscillatory member, a transverse beam fixed on each oscillatory member, and pistons in the said cylinders respectively coupled by connecting rods to corresponding ends of the beams.

RICHARD EDWARD WATTS.